United States Patent [19]
Haglund

[11] 4,077,159
[45] Mar. 7, 1978

[54] HORTICULTURAL CONTAINER ASSEMBLY HAVING FALSE BOTTOM AND SAUCER

[76] Inventor: Robert J. Haglund, 5990 Orchard Bend, Birmingham, Mich. 48010

[21] Appl. No.: 674,383

[22] Filed: Apr. 7, 1976

[51] Int. Cl.² .......................... A01G 9/02; A01G 9/04
[52] U.S. Cl. .......................................... 47/66; 47/71; 47/79
[58] Field of Search ................. 47/34 R, 34 D, 34 A, 47/38, 37, 38.1, 34 S, 66, 71, 79–81; 249/141, 142; 425/249; 264/121; 220/68

[56] References Cited

U.S. PATENT DOCUMENTS

| | | | |
|---|---|---|---|
| 1,117,474 | 11/1914 | Benning | 47/79 |
| 2,055,844 | 9/1936 | Kneller | 47/38 |
| 2,067,716 | 1/1937 | Landow | 47/34 R UX |
| 2,238,132 | 4/1941 | Ritter | 47/34 A UX |
| 2,404,370 | 7/1946 | Fowlkes | 47/66 |
| 2,417,178 | 3/1947 | Ritter | 47/34 R |
| 2,484,909 | 10/1949 | Ritter | 47/38 |
| 3,212,156 | 10/1965 | Derror | 249/141 X |
| 3,375,554 | 4/1968 | Blumer | 249/142 |
| 3,660,002 | 5/1972 | Morroni | 425/249 X |
| 3,896,587 | 7/1975 | Insalaco | 47/66 |

FOREIGN PATENT DOCUMENTS

| | | | |
|---|---|---|---|
| 455,117 | 3/1949 | Canada | 47/34.1 |
| 1,023,918 | 2/1958 | Germany | 47/38.1 |
| 536,538 | 12/1955 | Italy | 47/80 |
| 682,576 | 2/1965 | Italy | 220/68 |
| 103,027 | 1/1917 | United Kingdom | 47/34 A |

*Primary Examiner*—Edgar S. Burr
*Assistant Examiner*—Steven A. Bratlie
*Attorney, Agent, or Firm*—Ronald L. Phillips

[57] ABSTRACT

A horticultural container assembly including a container which has an open end pot and a hollow sub-base defined by an annular wall provided by an extension of the annular wall of the pot beyond a separable perforated base of such a pot, the annular wall of the sub-base terminating at a base rim for supporting the pot on a support surface and having integral therewith a cup shaped saucer of a size received fully within the hollow sub-base by the inner peripheral wall. The perforated base, inner peripheral wall and base rim of the pot have means associated therewith for cooperatively providing with the saucer at least one drain-vent passage that is open at one end to the exterior of the sub-base of the container and having its other end in communication with the perforated base and with the interior of the saucer.

2 Claims, 6 Drawing Figures

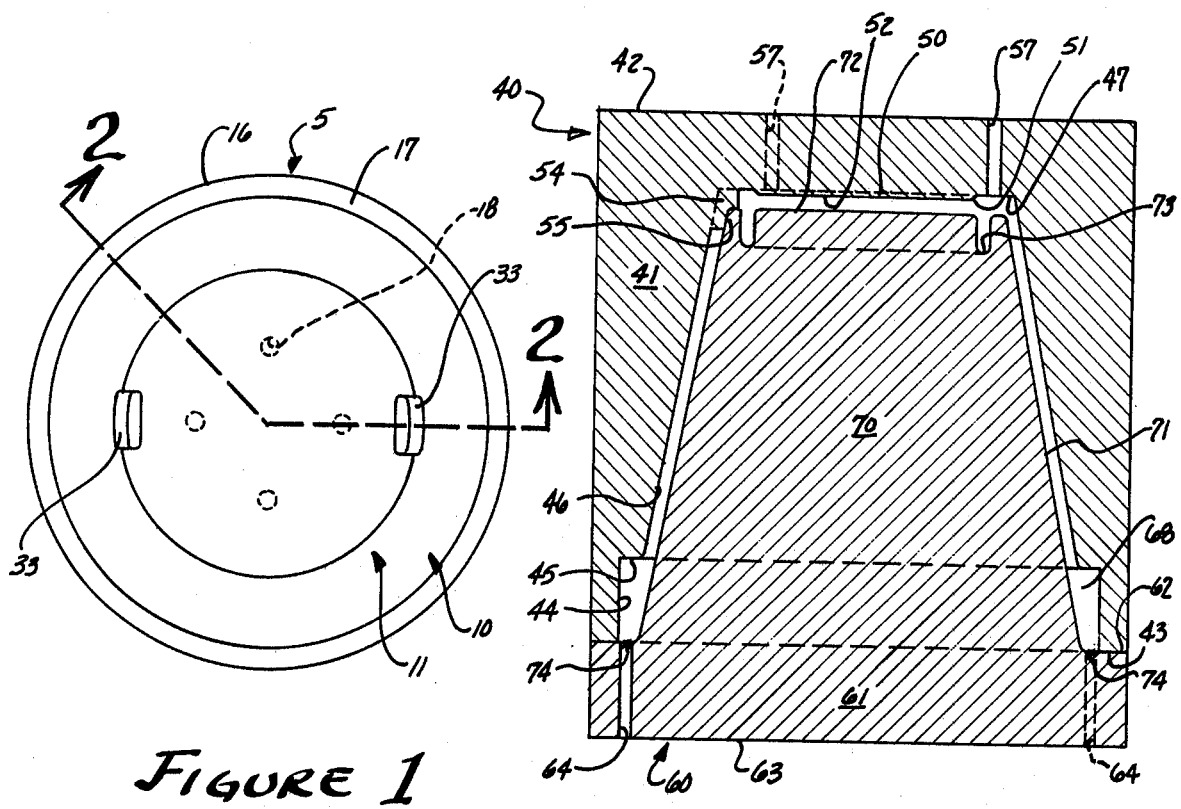
FIGURE 1
FIGURE 3
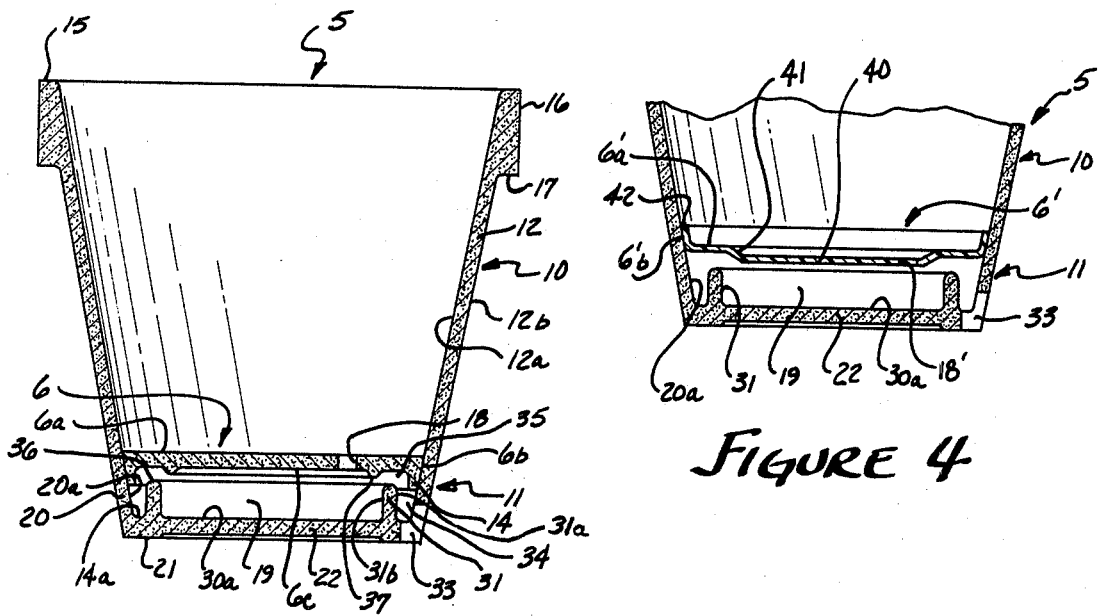
FIGURE 2
FIGURE 4

HORTICULTURAL CONTAINER ASSEMBLY HAVING FALSE BOTTOM AND SAUCER

This invention relates to horticultural containers and, in particular, to a horticultural container and a saucer for same.

It is well known in the prior art to provide one or more drainage holes in the bottom of horticultural containers such as nursery and flower pots or containers. These drainage holes are provided in order to obtain two desirable results, that is, to permit the drainage from the pot of excess water to thereby prevent the roots of a plant, so to speak, from standing in water and to permit air to circulate more freely within the pot thereby promoting root growth with resulting faster growth of the plant potted therein. These nursery or flower pots of the prior art have been satisfactory when used in a nursery as by being embedded in the ground or placed on a porous support such as the ground.

However, for example, when these pots are used indoors for houseplants, they are normally used with saucers whereby the perforated bottom of the pot is directly supported on the non-porous flat base plate of the saucer or alternatively on some other non-porous support. Unless the person taking care of the houseplant allows all of the water to drain from the pot after watering and before placing the pot back into the saucer or if he or she waters the plant while the pot is still on its saucer, the pot may be standing in water after the soil or other planting mixture in the pot is wet. This in effect causes overwatering of the plant which is one of the most common problems with houseplants when cared for by the amateur horticulturist.

Furthermore, the conventional clay pot and saucer cannot be stacked as an assembly. When attempting to provide a stackable pot and saucer assembly, there typically results a complex structural arrangement having a highly visible elevated joint between pot and saucer. Such arrangements require costly complex molds having independently moveable cores or core inserts and dictate plastic injection molding where clay or some other material may be preferred for the pot and/or the saucer.

It is, therefore, the principal object of this invention to provide a horticultural container having an improved drainage and aerating means incorporated therein which can be used by itself or with a separable perforated base cooperating with a saucer integral and fully contained within the sub-base thereof.

Another object of this invention is to provide an improved horticultural pot and pot saucer and separable perforated base which when assembled together define means to allow for the drainage of water from the pot while still permitting aeration of the growing contents of the pot.

A further object of this invention is to provide an improved horticultural container and saucer and separable perforated base assembly which are stackable as a unit assembly.

Another object is to provide a simply moldable horticultural container having a container section and a separable perforated base and in addition a hollow sub-base having a saucer fully within and integral therewith and also having a hole for providing a drain-vent path in communication with the internal saucer and the exterior of the container.

These and other objects of the invention are obtained by a horticultural container assembly which includes a container and a saucer, the container including a pot portion having an upper portion including an annular upper wall upstanding from a separable perforated dish-like base slidably received therein to provide with the upper surface of the base a cavity for a plant or the like and a lower portion including an annular lower wall depending from the separable base level, the inner peripheral surface of the lower wall providing a hollow sub-base for the pot portion of the container and, a cup shaped saucer integral within the hollow sub-base beneath the perforations in the separable base of the pot, the sub-base and saucer having a drain-vent passage means associated therewith in communication with one side of the separable perforated base and the exterior of the container.

For a better understanding of the invention as well as other objects and features thereof, reference is made to the following detailed description of the invention to be used in conjunction with the accompanying drawings, wherein:

FIG. 1 is a bottom plan view of a horticultural container assembly in accordance with a preferred embodiment of the invention;

FIG. 2 is a sectional view of the horticultural container assembly of FIG. 1 taken along line 2—2 in FIG. 1;

FIG. 3 is a sectional view of a mold used in fabricating the container of FIG. 1;

FIG. 4 is a sectional view of a portion of a container used with an alternate embodiment of a base, all in accordance with the invention;

Figure 5:
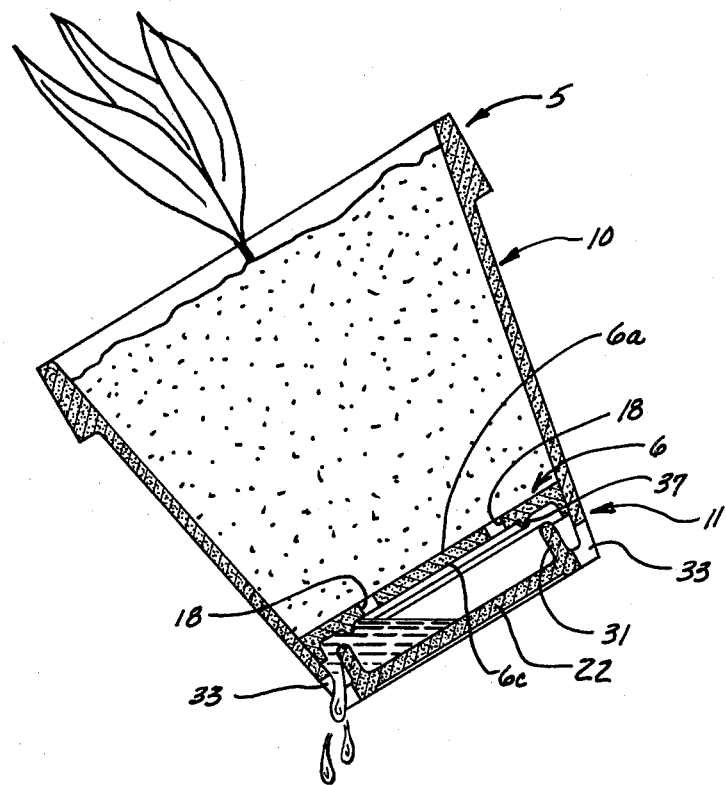
FIG. 5 is a sectional view of the horticultural container assembly of FIG. 1 but with the horticultural container assembly tilted to show how water can be poured from the saucer of this assembly.
Figure 6:
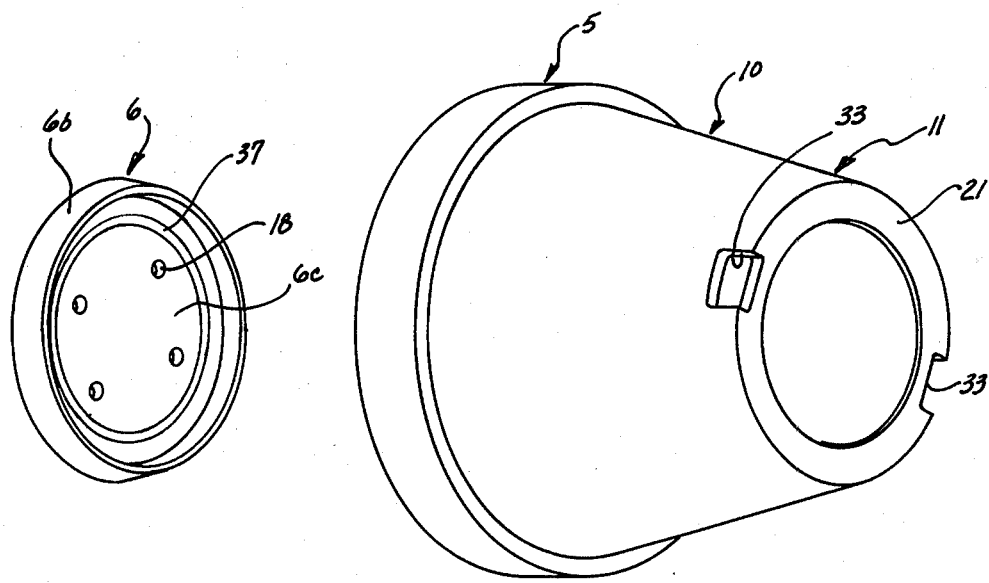
FIG. 6 is an exploded bottom perspective view of the horticultural container assembly of FIG. 1.

Referring first to FIGS. 1 and 2, the horticultural container assembly of the invention includes an improved pot or container generally designated 5, and a separable perforated base 6 slidably received therein when it is used for a houseplant, as an example. The pot or container 5 and the perforated base 6 can be made of the same suitable material or of different suitable materials from those materials normally used in making prior art flower pots and saucers.

Preferably, these materials are such as to provide a porous cell structure with cells large enought to permit the passage of air therethrough to aerate the plant root growth within the pot and yet the cells are small enough to prevent the leakage out through the side wall or walls of the pot of the water and moisture from the soil content within the pot. However, it should be realized that, if desired, either the pot or the saucer, or both, can be made of a material so that it is pervious to both moisutre and air or of a material so that it is impervious to both moisture and air.

However, in view of the constructional details of the pot or container 5 in accordance with the invention, such a structure, to be described, is readily adapted to be fabricated by a very simple low pressure and low heat molding process and, accordingly, both the flower pot or container 5 and the perforated base 6, in a preferred embodiment, are made of a material consisting of sand particles bonded with a suitable resin. For example, the resin may be a synthetic resin such as either a thermosetting or thermoplastic resin and the mixture may comprise 85% to 98% by weight of sand particles and 2% to 15% by weight of resin. This mixture is readily blown by air pressure in a range such as 40-100 p.s.i., into a simple mold cavity, to be described, which is devoid of independently moveable cores and core inserts as will become more clear later, the mold being heated to a suitable temperature determined by the resin used and the desired cycle time.

Now, in accordance with the invention, the pot or container 5, hereinafter referred to as the container, of unitary construction, includes an upper portion 10 which, in effect, provides a hollow open end pot container of somewhat conventional configuration and a lower portion 11 which, in effect, provides in cooperation with the perforated base 6 a hollow closed-end sub-base for the pot container for a purpose which will become apparent. As stated above, the upper portion 10 of the container can be of any desired conventional configuration and, in the construction illustrated, is of truncated conical shape. Thus, as shown, the upper portion 10 of the container 5 includes an annular wall 12 extending upwardly and flaring radially outward from the perforated base 6 to terminate at an annular upper edge rim 15, the inner conical surface 12a of the wall 12 forming, with the upper surface 6a of the base 6 a hollow pot container. The peripheral surface 6b of the base 6 conforms to the inner conical surface 12a and is sized in this case by selection of the diameters thereof, so as to engage the surface 12a and be held thereby at the desired elevation as shown. For added support, the base 6 is preferably formed with a downwardly turned integral rib 14 that increases the area of the base's peripheral surface 6b without increasing the thickness of the center section thereof. To permit stacking of a plurality of containers, with or without their perforated bases 6, and without having them become wedged together so as to hinder their unstacking, the upper peripheral end of the upper portion 10 of the wall 12 of the pot is provided with an enlarged reinforcing outer peripheral rim 16 extending from the upper edge rim 15 that is connected by a lower radial flange 17 to the exterior conical surface 12b of wall 12. The extent between the upper edge rim 15 and flange 17 is at least equal to but preferably greater than the extent between the upper surface 6a of perforated base 6 and the bottom of the lower portion 11 of the container 5.

To permit drainage of excess water from the hollow pot container portion of the container 5, the perforated base is provided with one or more drain holes 18, four such holes 18 being shown in the structure illustrated, these drainage holes being positioned a predetermined distance radially inward from the wall 12 so that drainage therethrough will fall into the cavity of a saucer 19 whose details will be described in detail shortly.

The lower portion 11 of the container also includes an annular ring-like wall 20, the outer or exterior peripheral surface of which is formed below the perforated base 6, in the embodiment illustrated, as a continuation of the exterior surface 12b and thus, in the construction illustrated would also be of conical configuration to extend a predetermined distance below the perforated base 6 to terminate at a lower or support edge rim 21, which lies in a plane substantially parallel to the perforated base 6 and, of course, also parallel to upper edge rim 15. A non-perforated disk-like bottom 22 integral with and recessed from the support edge rim 21 extends parallel to the perforated base 6 and closes the bottom of the hollow sub-base of the pot 5.

Referring now to the saucer 19, it is of cup shape and integral with the bottom 22 and is thus also made of sand and synthetic resin like the container 5. The saucer 19 includes an annular upstanding side wall 31 extending from the bottom 22 and has an outer peripheral surface 31a spaced radially inward from the interior 20a of the lower portion or sub-base of the container 5. The inner peripheral surface 31b of the wall 31 forms with the upper surface 30a of the bottom 22 inward thereof, an open end saucer container beneath the perforated base 6. As is apparent, the support edge rim 21 of the container 5 has a larger effective support diameter with reference to the construction illustrated, than that of the inwardly contained saucer 19, whereby this edge rim can provide more stability against tipping over of the container 5, especially if it has a top heavy plant potted therein.

Although the perforated base 6 may be loosely positioned in the container so that it can be removed when desired in order to use the container 5 without a perforated base 6 over the saucer 19 as is common in a greenhouse, for houseplant use and to permit easy stacking of assemblies of containers 5 and perforated bases 6, suitable means may be provided, as will be apparent to those skilled in the mechanical and chemical arts, to secure a container 5 and perforated base 6 together into a unit assembly. For example, in an assembly wherein both the container 5 and perforated base 6 are made of a material consisting of sand particles bonded with a resin, as previously described, the perforated base 6 may be bonded directly to the hollow sub-base of the container at their interfaces by the use of the same resin used in their fabrication.

To permit aeration and drainage of the interior of the sub-base of the container 5 and in particular the bottom or lower surface 6c of the perforated base 6 of the container, the container 5 and saucer 19 cooperate to provide one or more suitable drain-vent passage means each of which is open at one end to ambient air exterior of the container and open at the other end to the space below the perforated base of the container and above the saucer.

In the embodiment illustrated, two such drain-vent passage means are used, with each including in this embodiment illustrated, a radial and axial extending passage through the wall 20 of the sub-base of container 5 as provided, for example, by a hole or aperture 33, in a preferred embodiment, extending inward and upward from the support edge rim 21. Each such aperture 33 is in communication at one end with one end of the remainder of the elements of its associated drain-vent passage means, which includes, in the embodiment illustrated, a continuous annular passage 34 provided by the outer wall 31a of the saucer and the interior 20a of the sub-base of container 5. Annular passage 34 in turn communicates with another continuous annular passage 35 provided between the rim or upper edge 36 of the saucer and the lower side 6c of the perforated base 6. Thus, each aperture 33 is in communication with a passage that extends radially inward toward the center of base 6 a sufficient distance so that it is open to the hollow sub-base radially inward of the wall 31 of the saucer 6 whereby to be in direct communication with the interior of the saucer.

Preferably, the annular passage 35 does not extend into direct communication with a drain hole 18 so as not to form a direct path for water draining out of such a drain hole 18 to the external drain hole 33 whereby the water would then flow to the exterior of the container 5 instead of directly into the saucer 19. This is preferably accomplished by an annular wall 37 extending downward from the lower side 6c of the perforated base 6 radially inward of the rim 36 of the saucer 19.

With this arrangement, if it is desirable to drain water from the saucer 19, when the perforated base 6 and container 5 are a unit assembly, it is only necessary to tilt this assembly in the manner shown in FIG. 5 whereby water can then flow out over the rim of the saucer 19 into one of the vent passage means for discharge to the exterior of the container 5. Preferably, two diagonally opposite drain-vent passages are provided as shown so that in the tilted position the upper passage vents the space above the trapped water to facilitate drainage through the lower passage. Any dirt or other growing media which may have escaped from the pot container portion of the container 5 out through a drain hole 18 into the saucer 19 will be retained therein since it would settle into the corner between the side wall 31 and top 30a of the saucer 19 as seen in FIG. 5.

Although the one or more apertures 33 through the wall 20 may take any desired shape and be located anywhere, as desired, so as to extend through the wall 20 to break out through the inner peripheral wall surface 20a of the container below the lower surface 6c of the perforated base 6, it is preferred, for ease in fabrication and also for an esthetic purpose that such a passage be formed as a generally rectangular shaped hole 33 without any sharp corners as shown. It should also be realized that where two or more such holes 33, extending upward and inward from the support edge rim 21, are provided, these holes will, in effect, divide the support edge rim 21 into two or more support pad sections, depending on the number of such radial slot recesses.

Referring now to FIG. 4, there is shown an alternate embodiment of a thin-wall, light-weight perforated base 6′ for use with a container 5 of the same construction as previously described. Perforated base 6′ which has a cup-like shape and is preferably made for example of a suitable plastic material by injection molding, includes a central depressed section 40 which in addition to having the drain holes 18′ also serves at its depending upturned section 41 to insure drippage into the saucer like the wall 37 in FIG. 2. The radially outer edge 42 of the perforated base 6′ turns upward to provide the desirably large peripheral surface 6b′ for engaging the interior 20a of the pot and in addition provides better sealing than if turned downward. As shown, the outer peripheral dimension of the outer side wall 6b′ of perforated base 6′ is of a predetermined size whereby this wall can be slidably received by the inner peripheral surface 20a of the container 5 whereby perforated base 6′ can be slidably and telescopically received in the sub-base of container 5 and secured therein, if desired, for example by bonding in a manner similar to that previously described or as by an interference press fit of these elements.

It is further contemplated that the separable perforated bases 6 and 6′ can be positively supported by the rim or upper edge 36 of the saucer 19 and in that case the saucer's edge is provided with one or more recesses to maintain communication between the saucer and the drain-vent holes 33. For even more support, one or more vertical support pillars could be formed on the top 30a of the saucer to support the base radially inward of the saucer's edge.

The particular construction of the container 5, as illustrated, permits it to be readily fabricated from the sand and resin material previously described by a simple low pressure and low heating molding process using, for example, permanent metal mold elements of simple configuration without the need of independently moveable cones or core inserts, thereby reducing the cost to fabricate these containers.

Thus, as shown schematically in FIG. 3, the mold elements would include an upper mold element or cope, generally designated 40, and a lower mold element or drag, generally designated 60, moveable with respect to each other between a molding position, the position shown, wherein the cope 40 and drag 60 are in abutment with each other along a parting line to be described, and a position in which these mold elements are in a spaced apart position relative to each other whereby to permit removal of a molded container 5 therefrom, as by leaving the cope 40 stationary while moving the drag 60 up into a down out of engagement therewith.

In the construction illustrated, the cope 40 includes a main body portion 41 having spaced apart upper and lower substantially planar surfaces 42 and 43, respectively. A cavity is provided in the body portion that extends inward from the surface 43, upward with reference to FIG. 3, as defined in succession by an inner annular wall 44 extending at right angle to surface 43, an annular radial flange wall 45 extending radially inward from wall 44 to connect with a radial inward tapered wall 46 that terminates at a second annular inward extending radial wall 47. Depending downward from the radial wall 47, or upper end, as seen in FIG. 3, of the cavity in body portion 41 is a short male plug portion 50 providing a depending annular outer peripheral wall 51, of predetermined short length, extending from the inner peripheral edge of radial wall 47 to terminate at a disk-like wall 52.

In addition, in the construction illustrated, the one or more drain-vent holes 33 are formed by the radial wall 47 and tapered wall 46 being provided with one or more sets of interconnected raised portions or ridges, such as radial inward and axially downward ridge 54 depending from the corner of this female cavity. To complete the formation of the drain-vent holes 33, the surface 55 of the ridges 54 conforms to and interfaces with the drag as described in more detail later. If more than one set of such ridges is used, they should preferably be spaced apart equally in relation to each other to form during the molding process the drain-vent passages in a container 5, as previously described.

The main body portion 41 of cope 40 is also provided with a plurality of equally spaced apart conventional sprue openings 57 that extend from the upper surface 42 of the cope 40 to intersect the radial wall 47 all for a purpose well known in the molding or casting arts. These sprue openings 57, if aligned at right angles to the surface 42, can also serve to receive the usual ejector pins, not shown, to effect or ensure discharge of a molded container from the cope 40.

Drag 60 includes a main body portion 61 having spaced apart upper and lower substantially planar surfaces 62 and 63, respectively. Upstanding from the upper surface 62 is a truncated conical male plug portion 70 having an annular radially inward inclined outer peripheral surface 71 of predetermined height from surface 62, and an upper disk-like surface 72 that connects at its outer periphery to the upper edge of surface 71. In addition, the plug portion 70 is also provided with an annular cavity or recess 73 in the disk-like end surface 72 thereof so as to form during the molding process the saucer 19, as previously described. The outside diameter of the plug portion 70 is of a size and the configuration of this plug portion is such so as to form with the cope 40, when positioned relative thereto as shown in FIG. 3 with the plug portion 70 positioned concentrically to wall 46 of cope 40 but radially inward thereof except for touching the drain-vent hole forming ridges 54, a substantially enclosed mold cavity, generally designated 68 which is an image configuration to that of container 5 complete with saucer 19.

As is well known, either the cope 40 or the drag 60, as is known, would be provided with a plurality of gas vent passages, such as the vent passages 64 in the drag 60 which extend from the upper surface 62 of the main body portion 61 of the drag to break out at the lower surface 63 thereof to be in direct communication with the mold cavity 68. Furthermore, a suitable screen 74 is provided in the mouth of each vent to prevent blockage while maintaining mold cavity integrity.

As shown, the parting line at the mating cope and drag surfaces 43 and 62 is thus at the upper edge rim 15 and therefore does not disturb the exterior pot surface. And it will also be understood that the parting line could be shifted to the radial flange 17 and still not disturb the exterior pot surface.

The above-described preferred embodiments are illustrative of the invention which may be modified by those skilled in the art within the scope of the appended claims.

I claim:

1. A horticultural container device including a longitudinally extending annular hollow wall having an upper portion and a lower portion, said lower portion having a support edge rim at the lower end thereof, an integral bottom extending from said support edge rim transversely across the interior of said wall to close said lower portion, said integral bottom forming with said upper portion of said wall an open-end pot, said integral bottom having an upstanding annular wall portion positioned a predetermined distance radially inward from said wall whereby a saucer is provided in the bottom of the pot, a separable base mounted in the pot on said wall, said separable base having at least one drain aperture radially inward of said annular wall portion of the saucer and, drain-vent passage means including at least one radial passage extending inward and upward from said support edge rim through said lower portion of said wall outward of and at the base of said upstanding annular wall portion and an interconnecting passage extending between said upstanding annular wall portion and said separable base whereby a drain-vent passage is provided that is in communication at one end with the exterior of said wall past said support edge rim and at its other end with said saucer below said base.

2. A horticultural container assembly according to claim 1, wherein said drain-vent passage means further includes an annular downwardly extending wall portion on the underside of said separable base to prevent drainage directly from said drain aperture to the exterior of said wall.

* * * * *